United States Patent
Fauran et al.

[11] 3,852,284
[45] Dec. 3, 1974

[54] NOVEL SUBSTITUTED OXAZINO(5,6,E)INDOLES

[75] Inventors: Claude P. Fauran; Michel J. Turin; Guy M. Raynaud, all of Paris; Claude J. Gouret, Meudon, all of France

[73] Assignee: Delalande S.A., Courbevoie, (Hauts de Seine), France

[22] Filed: June 6, 1972

[21] Appl. No.: 260,298

[30] Foreign Application Priority Data
June 8, 1971  France .............................. 71.20708

[52] U.S. Cl............ 260/244 R, 260/319.1, 424/248
[51] Int. Cl............................................. C07d 87/20
[58] Field of Search .................................... 260/244

[56] References Cited
OTHER PUBLICATIONS
Grino et al., Chem. Abstracts, Vol. 74 (Item 22645) (1971).

*Primary Examiner*—Harry I. Moatz
*Attorney, Agent, or Firm*—Woodhams, Blanchard and Flynn

[57] ABSTRACT

Compounds of the formula

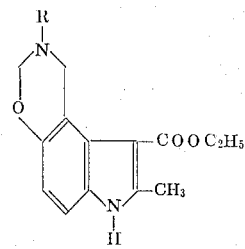

wherein R is alkyl having 2 or 3 carbon atoms, alkyl having 2 or 3 carbon atoms substituted by one or more hydroxyl and dialkylamino wherein the latter alkyl has 1 to 4 carbon atoms, alkenyl containing up to 3 carbon atoms or cycloalkyl containing up to 6 carbon atoms. The compounds are prepared by reacting 2-methyl-3-ethoxycarbonyl-5-hydroxy indole with a primary amine of the formula $RNH_2$ in an excess of formol. The compounds possess analgesic, antiinflammatory, spasmolytic, vasodilatatory, hypotensive, diuretic and respiratory analeptic properties.

7 Claims, No Drawings

NOVEL SUBSTITUTED OXAZINO(5,6,E)INDOLES

The present invention relates to novel substituted oxazino [5,6,e] indoles, their process of preparation and their therapeutic application.

[5,6,e] Oxazino indoles of the general formula:

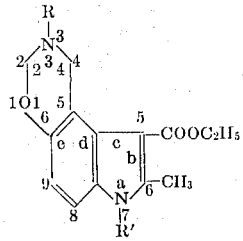

in which R represents a methyl or butyl radical and R' represents a methyl or phenyl radical, are known from the article, Khim-Farmatsevt Zh. (1970) No. 1 pages 26 to 32. The antituberculous activity of these compounds has been studied but their effect on Mycobacterium tuberculosis was found to be negligible.

We have ascertained that by preventing substitution of the indolic nitrogen atom and that by suitably selecting the nature of the chains attached to the oxazinic nitrogen atom, new compounds are obtained which, contrary to the previously known compounds, possess interesting therapeutic properties and may be utilised for the relief of pain and in the treatment of inflammations, visceral spasms, circulatory insufficiencies, hypertensions and oedemas as well as respiratory troubles.

The new compounds correspond to the general formula:

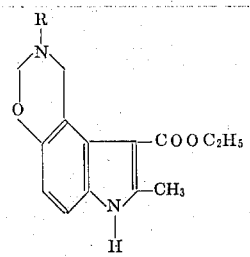

in which R represents:

an alkyl radical containing 2 or 3 carbon atoms, optionally substituted by one or more hydroxy or dialkylamino radicals, in which the alkyl group contains from 1 to 4 carbon atoms;

an alkenyl radical containing a maximum of 3 carbon atoms; or a cycloalkyl radical containing a maximum of 6 carbon atoms.

The process according to the invention comprises reacting 2-methyl-3-ethoxycarbonyl-5-hydroxy indole of formula:

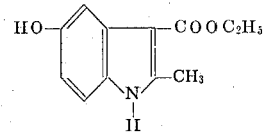

with a primary amine of formula:

$R - NH_2$ in which R has the same signification as in formula (I), in an excess of formal.

The following preparation is given by way of example to illustrate the invention.

EXAMPLE 3-(2'-hydroxy-1'-ethyl)-5-ethoxycarbonyl-6-methyl-2,4-dihydro-[5,6,e] oxazino indole. (Code No. 70387)

50ml of dioxan and 18ml of a solution of 40% formaldehyde are introduced into a 1 litre balloon-flask. 9g of ethanolamine is then added thereto at a temperature of less than 10°C, followed by 21g of 2-methyl-3-ethoxycarbonyl-5-hydroxy indole. The mixture is refluxed for 5 hours and is then cooled. The precipitate formed is dried and then recrystallized from absolute alcohol.

| Melting point | = | 199°C |
|---|---|---|
| Yield | = | 53% |
| Empirical formula | = | $C_{16}H_{20}N_2O_4$ |

| Elementary analysis: | C | H | N |
|---|---|---|---|
| Calculated % | 63.14 | 6.62 | 9.21 |
| Found % | 63.23 | 6.66 | 9.29 |

The compounds listed in the following Table have been prepared by the same method of operation.

TABLE I

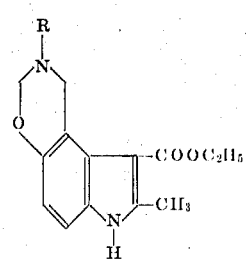

| Code No. | R | Empirical formula | Molecular weight | Melting point, °C | Yield, percent | Calculated | | | Found | | |
|---|---|---|---|---|---|---|---|---|---|---|---|
| | | | | | | C | H | N | C | H | N |
| 70330 | −⟨S⟩ | $C_{20}H_{26}N_2O_3$ | 342.42 | 190 | 44 | 70.15 | 7.65 | 8.18 | 70.08 | 7.58 | 8.37 |

TABLE I—Continued

| Code No. | R | Empirical formula | Molecular weight | Melting point, °C. | Yield, percent | Calculated C | Calculated H | Calculated N | Found C | Found H | Found N |
|---|---|---|---|---|---|---|---|---|---|---|---|
| 70364 | —CH(CH₃)(CH₃) | $C_{17}H_{22}N_2O_3$ | 302.36 | 193 | 53 | 67.59 | 7.33 | 9.27 | 67.70 | 7.40 | 9.46 |
| 70385 | —CH₂—CH=CH₂ | $C_{17}H_{20}N_2O_3$ | 300.34 | 178 | 26 | 68.00 | 6.71 | 9.33 | 68.17 | 6.83 | 9.25 |
| 70386 | —C₂H₅ | $C_{16}H_{20}N_2O_3$ | 288.33 | 213 | 55 | 66.64 | 6.99 | 9.72 | 66.69 | 7.12 | 9.56 |
| 71134 | —CH₂—CH₂—N(C₂H₅)₂ | $C_{20}H_{29}N_3O_3$ | 359.46 | 136 | 47 | 66.82 | 8.13 | 11.69 | 66.73 | 8.24 | 11.67 |

The compounds of formula (I) have been studied on animals in the laboratory and have been shown to possess analgesic, antiinflammatory, spasmolytic, vasodilatatory, hypotensive, diuretic and respiratory analeptic properties.

1. Analgesic Properties

The compounds of formula (I) administered by oral means on the mouse, are capable of reducing the number of painful stretchings produced by the intraperitoneal injection of acetic acid.

By way of example, the administration of 100 mg/kg/PO of compound No. 70330 reduced the number of painful stretchings by 40%.

2. Antiinflammatory Properties

These properties are shown by a diminution of the under-planatary oedema provoked by the local injection of a phlogogenic agent, such as carraghenine, to a rat following oral administration of the compounds of formula (I).

The results obtained with certain of the compounds are given in the following Table II:

TABLE II

| Code No. of compound tested | Dose administered | Percentage of reduction of the oedema |
|---|---|---|
| 70330 | 100 mg/kg/PO | 70 % |
| 70385 | 100 mg/kg/PO | 55 % |
| 70386 | 50 mg/kg/PO | 45 % |
| 70387 | 100 mg/kg/PO | 45 % |
| 71134 | 50 mg/kg/PO | 55 % |

3. Spasmolytic Properties

The compounds of formula (I), introduced in the conserving medium, are capable of opposing the contractural action of barium chloride on the isolated duodenum of the rat. This activity is evaluated by taking papaverine as standard.

By way of examples, the activity of compound No. 70330 is equivalent to that of papaverine, whilst the activity of compound No. 71134 is twice that of papaverine.

4. Vasodilatatory Properties

The compounds of formula (I) are capable of augmenting the flow of the coronary vessels of the isolated heart of a guinea-pig; when said compounds are added in the perfusion liquid of said organ.

The results obtained with two compounds of formula (I) are given in the following Table III.

TABLE III

| Code No. of compound tested | Concentration | Augmentation of flow |
|---|---|---|
| 70330 | 2.5 µg/ml | 30 % |
| 71134 | 1 µg/ml | 50 % |

5. Hypotensive properties

Administered by intraveinous means on the anaesthetised rat, the compounds of formula (I) provoke a lowering of the arterial pressure.

The results obtained with certain of the compounds are given in the following Table IV:

TABLE IV

| Code No. of compound tested | Dose administered | Reduction of arterial pressure intensity | Reduction of arterial pressure duration |
|---|---|---|---|
| 70364 | 1 mg/kg/IV | 55 % | >60 mm |
| 70387 | 1 mg/kg/IV | 45 % | 30 mm |
| 71134 | 1 mg/kg/IV | 60 % | 20 mm |

6. Diuretic Properties

The compounds of formula (I) administered by oral means to the mouse simultaneously with a volume of 1 ml of an isotonic solution of sodium chloride per 25g of the corporeal weight of the mouse, are capable of provoking an augmentation of the volume of urine emitted by reference to control animals, the volume being measured for 4 hours following administration.

By way of example, in a dose of 20 mg/kg/PO the compound No. 71134 augments diuresis by 65%.

7. Respiratory Analeptic Properties

The compounds of formula (I), administered by intraveinous means to an anaesthetised guinea-pig, are capable of opposing the respiratory depression provoked by morphine.

In a dose of 2.5 mg/kg/IV, compound No. 70387 augments the respiratory frequency by 80% over a period of 5 minutes, whilst compound No. 71134 shows an augmentation of 50%.

As can be seen from the results expressed above and those shown in the following Table V, the difference between the pharmacologically active dose and the lethal dose is sufficiently great to permit the compounds of formula (I) to be used in therapeutics.

TABLE V

| Code No. of compound tested | DL 50 (approached) on the mouse |
|---|---|
| 70330 | 1500 mg/kg/PO |
| 70364 | 750 mg/kg/PO |
| 70385 | 950 mg/kg/PO |
| 70386 | 450 mg/kg/PO |
| 70387 | 1100 mg/kg/PO |
| 71134 | 730 mg/kg/PO |

As has already been stated in the introduction the compounds of formula (I) are utilisable in the treatment of diverse pains, such as inflammations, visceral spasms, circulatory insufficiencies, hypertensions, oedemas and respiratory troubles.

They may be administered by oral means in the form of tablets, dragees or gelules containing 25 to 200 mg of active ingredient (3 to 5 times a day) and by rectal means in the form of suppositories containing 20 to 150 mg of active ingredient (1 or 2 times a day).

Accordingly, the present invention relates to a therapeutic composition comprising a compound of the general formula (I) together with a therapeutically-acceptable carrier.

What we claim is:

1. A compound of the formula:

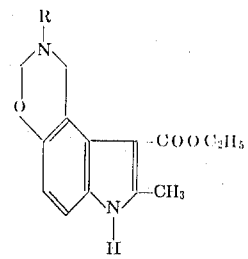

in which R is:
alkyl having 2 or 3 carbons, alkyl having 2 or 3 carbons and substituted by one hydroxy or dialkylamino in which the latter alkyl has 1 to 4 carbons, alkenyl having up to 3 carbons, or cycloalkyl having up to 6 carbons.

2. A compound as claimed in claim 1, in which R is ethyl.

3. A compound as claimed in claim 1, in which R is isopropyl.

4. A compound as claimed in claim 1, in which R is allyl.

5. A compound as claimed in claim 1, in which R is 2-hydroxy-1-ethyl.

6. A compound as claimed in claim 1, in which R is diethylamino-ethyl.

7. A compound as claimed in claim 1, in which R is cyclohexyl.

* * * * *